United States Patent Office 3,421,931
Patented Jan. 14, 1969

3,421,931
COATING OF PULVERULENT MATERIALS
Auguste Reverand, Lyon, France, assignor to Societe Rhodiaceta, Paris, France, a corporation of France
No Drawing. Filed Aug. 2, 1965, Ser. No. 476,722
Claims priority, application France, Aug. 6, 1964, 984,415
U.S. Cl. 117—100   16 Claims
Int. Cl. C06b 19/02

ABSTRACT OF THE DISCLOSURE

Pulverulent materials are given an improved coating of a soluble interpolyamide by suspending the pulverulent material in a system of 3 or more components which dissolves the interpolyamide and progressively adding to the suspension a system of 3 or more components which is a non-solvent for the polyamide. At least two of the components, and preferably all of them, are common to the solvent and non-solvent, one being an alcohol and another being (i) a diol or (ii) an alcohol of more than 4 carbon atoms. The solvent contains more than 50% of alcohol and the non-solvent less than 50%.

---

This invention relates to the coating of pulverulent materials.

To coat pulverulent materials, particularly explosive or pyrotechnic materials, it has recently been proposed to use interpolyamides which melt between 140 and 180 C. and which are soluble in alcohols or glycols by themselves or in admixture with water or chlorinated lower aliphatic hydrocarbons. The process as proposed consists in dispersing the powder by stirring in a solution of the interpolyamide, whereafter the interpolyamide is precipitated by adding a liquid which is a non-solvent for it.

This process generally does not permit of obtaining a perfect coating of the powder particles, because the sudden precipitation of the interpolyamide causes agglomeration and gives a final product having variable characteristics.

The present invention has for its object an improvement in the process for the coating of materials in powder form with soluble interpolyamides, which is free from these disadvantages.

The process of the invention consists in dissolving the interpolyamide in a solvent comprising at least two constituents and in addition containing a diol or an alcohol having at least 4 carbon atoms in the molecule, suspending the pulverulent material in this solution, then adding progressively and with gentle stirring, until the interpolyamide is completely precipitated, a liquid which is a non-solvent for the latter and likewise comprises at least two constituents, in addition contains a diol or an alcohol having at least 4 carbon atoms in the molecule, the solvent and the non-solvent being miscible in all proportions and having at least one common constituent other than a diol or alcohol having at least 4 carbon atoms in the molecule. (For the sake of brevity the alcohols containing at least 4 carbon atoms will be referred to below as "higher alcohols.") Usually the same diol or higher alcohol will be used in both the solvent and the non-solvent. The proportion of the diol will usually be between 2 and 10%, and especially about 5% on the total weight of the solvent and of the non-solvent.

This technique causes a slow and progressive diminution of the solvent power of the liquid in which the interpolyamide is dissolved until there is obtained an interpolyamide gel, the stability of which is improved by the presence of the diol or higher alcohol. At this instant, the pulverulent material is thus in suspension not in a liquid but in a gel, and each particle of the material is completely coated with this gel as a result of the stirring.

The precipitation of the interpolyamide is then completed by continuing the addition of the non-solvent liquid. There is finally obtained a suspension of coated particles of interpolyamides, which are separated from the liquid by conventional means, for example by centrifuging.

By adding a wetting agent, for example of the polyethylene glycol type, to the solvent and/or to the non-solvent, the stability of the gel and the suspension of the pulverulent material in the gel can be still further improved.

The coating treatment may be followed by drying and optionally by agglomeration by compression under heat, particularly in the case of explosive materials in powder form.

Any type of soluble interpolyamide may be used, but it is preferred to use the linear interpolyamides obtained by polycondensation of a mixture of hexamethylenediammonium adipate and caprolactam, or ternary interpolyamides obtained by polycondensation of a mixture of hexamethylenediammonium adipate, caprolactam and hexamethylenediammonium sebacate.

Solvents for these interpolyamides are well known: they include for example water-alcohol mixtures with a high content of alcohol and mixtures comprising an alcohol and a chlorinated aliphatic hydrocarbon. The types most usually employed industrially are water-methanol mixtures containing about 80% of methanol and methanol-water-trichlorethylene mixtures containing 78% of methanol, 6% of water and 16% of trichlorethylene, and these are quite satisfactory for the present purpose. (All proportions are by weight.)

In the first case, it is possible in advantageous manner to use as non-solvent a water-methanol mixture containing a high proportion of water, for example 80% by weight, and in the second a mixture in which the chlorinated hydrocarbon and water together preponderate over the methanol. As already stated, both the solvent and the non-solvent also contain a higher alcohol or a diol, e.g. isobutyl or benzyl alcohol or better still ethylene glycol or diethylene glycol.

The process of the invention can be used to coat any material in powder form which is insoluble in the solvent for the interpolyamide, and its use is particularly recommended for the coating of explosive or pyrotechnic powders, pigments and abrasives.

The following examples illustrate the invention.

EXAMPLE 1

20 g. of interpolyamide, obtained by polycondensation of a mixture of 20% of hexamethylenediammonium adipate, 50% of caprolactam and 30% of hexamethylenediammonium sebacate, is dissolved by heating in 200 g. of a solvent consisting of 75% of methanol, 20% of water and 5% of ethylene glycol.

180 g. of the explosive powder known under the name of Tolite (mean grain size 16 microns) are slowly introduced while stirring into this solution so as to form a homogeneous suspension without any agglomeration or deposition.

The stirring speed is then regulated so as to be just at the limit of sedimentation, which any technician will be able to determine without difficulty. 2000 g. of a non-solvent, consisting of 57% of water, 40% of methanol and 3% of ethylene glycol, is then added dropwise to this suspension at a rate of 100 ml. in 3 minutes.

When about one quarter of the non-solvent has been added, there is formed a gel of interpolyamide containing the Tolite particles in suspension. On completing the addition of the non-solvent, the interpolyamide is entirely precipitated on the Tolite grains, which are completely coated.

After decantation, the coated grains are washed with water and centrifuged to a water content below 0.02%.

EXAMPLE 2

10 g. of interpolyamide, obtained by polycondensation of a mixture of 55% by weight of hexamethylenediammonium adipate and 45% by weight of caprolactam, are dissolved by heating in 500 g. of a solvent consisting of 80% of methanol, 15% of trichlorethylene and 5% of benzyl alcohol.

25 g. of colloidal silica are slowly introduced while stirring into this solution to form a homogeneous suspension.

The speed of stirring is regulated so as to maintain the silica just in suspension, and then 400 g. of a non-solvent consisting of 20% of methanol, 75% of trichlorethylene and 5% of benzyl alcohol are added dropwise in one hour.

The interpolyamide gel is formed when about a quarter of the non-solvent has been added. On completing the addition of the non-solvent, the interpolyamide is entirely precipitated on the silica particles, which are completely coated.

After washing and drying, the coated silica can be used as a loading agent, for example for polyamides in which the dispersion of the silica is facilitated by the coating of interpolyamide.

EXAMPLE 3

15 g. of interpolyamide, obtained by polycondensation of a mixture of 20% of hexamethylenediammonium adipate, 50% of caprolactam and 30% of hexamethylenediammonium sebacate, are dissolved by heating in 150 g. of a solvent consisting of 75% of methanol, 20% of water and 5% of diethylene glycol.

85 g. of ferric oxide in powder form (grain size between 2 and 10μ) is slowly introduced while stirring into this solution so as to form a homogeneous suspension without any agglomeration or deposition.

The stirring speed is then regulated so as to be just at the limit of sedimentation. 1500 g. of a non-solvent mixture consisting of 57% of water, 40% of methanol and 3% of diethylene glycol is slowly added to this suspension in 30 minutes.

When about one quarter of the non-solvent has been added, there is formed a gel of interpolyamide, which precipitates on to the ferric oxide grains as the solvent power of the medium decreases.

On completing the addition of non-solvent, the interpolyamide is entirely precipitated on the ferric oxide grains, which are completely coated.

After decantation, the coated ferric oxide is washed 3 times with 500 g. of distilled water, centrifuged, and dried to a water content below 0.02%.

This coating permits stable tablets to be obtained from the powder by compression moulding.

EXAMPLE 4

10 g. of interpolyamide, obtained by polycondensation of a mixture of 20% of hexamethylenediammonium adipate, 50% of caprolactam and 30% of hexamethylene diammonium sebacate, is dissolved by heating in 100 g. of a solvent consisting of 75% of methanol, 20% of water and 5% of diethylene glycol.

40 g. of powdered graphite (grain size between 2 and 10μ) is slowly introduced while stirring into this solution so as to form a homogeneous suspension without any agglomeration or deposition.

The stirring speed is then regulated so as to be just at the limit of sedimentation. 1000 g. of a non-solvent mixture, consisting of 57% of water, 40% of methanol and 3% of diethylene glycol, is slowly added to this suspension in 30 minutes.

When about a quarter of the non-solvent has been added, a gel of interpolyamide is formed which precipitates on the graphite grains as the solvent power of the medium decreases.

On completing the addition of the non-solvent, the interpolyamide is entirely precipitated on the graphite grains, which are completely coated.

After decantation, the coated graphite is washed 3 times with 500 g. of distilled water, centrifuged, and dried to a water content below 0.02%.

I claim:

1. Process for coating pulverulent materials with soluble interpolyamides, which comprises suspending the pulverulent material in a solution of an interpolyamide obtainable by polymerisation of a mixture comprising hexamethylene diammonium adipate and caprolactam, in a liquid solvent containing at least 50% by weight of an alcohol, 2–10% by weight of a hydroxylic compound selected from the group consisting of diols and higher alcohols having at least 4 carbon atoms in the molecule, and at least one other constituent, the amount of solvent being effective to completely dissolve said interpolyamide, then adding progressively and with gentle stirring until the interpolyamide is completely precipitated, a liquid which is a non-solvent for the latter and contains up to 50% by weight of an alcohol, 2–10% by weight of a hydroxylic compound selected from the group consisting of diols and higher alcohols having at least four carbon atoms in the molecule, and at least one other constituent, the amount of non-solvent being effective to completely precipitate said interpolyamide, and the solvent and non-solvent being miscible in all proportions and separating the coated pulverulent material from the liquid solvent and non-solvent.

2. Process according to claim 1, wherein the same said hydroxylic compound is present in both the solvent and the non-solvent.

3. Process according to claim 1, wherein at least one of the solvent and non-solvent contains also a wetting agent.

4. Process according to claim 1, wherein the interpolyamide is obtained by polycondensation of hexamethylenediammonium adipate, caprolactam and hexamethylenediammonium sebacate.

5. Process according to claim 1, wherein the solvent comprises an alcohol-water mixture containing at least 50% by weight of an alcohol and the non-solvent is an alcohol-water mixture containing at least 50% by weight of water.

6. Process according to claim 5, wherein the alcohol is methanol.

7. Process according to claim 1, wherein the solvent comprises a mixture of an alcohol and a chlorinated hydrocarbon containing at least 50% by weight of an alcohol, and the non-solvent comprises a mixture of an alcohol and a chlorinated hydrocarbon containing at least 50% by weight of the chlorinated hydrocarbon.

8. Process according to claim 7, wherein the alcohol is methanol.

9. Process according to claim 1, wherein the solvent comprises a mixture of an alcohol, a chlorinated aliphatic hydrocarbon and water containing at least 50% by weight of an alcohol, and the non-solvent is a mixture of an alcohol, a chlorinated aliphatic hydrocarbon and water in which the chlorinated hydrocarbon and water constitute at least 50% by weight of the non-solvent.

10. Process according to claim 9, wherein the alcohol is methanol.

11. Process according to claim 1, wherein the solvent and non-solvent have the same constituents in different proportions.

12. Process according to claim 1, wherein the diol or higher alcohol is ethylene glycol, diethylene glycol, isobutyl alcohol or benzyl alcohol.

13. Process according to claim 1, wherein grains of an explosive, pyrotechnic or abrasive material are coated.

14. Process for coating pulverulent materials with soluble interpolyamides, which comprises suspending the pulverulent material in a solution of an interpolyamide obtainable by polycondensation of a mixture comprising hexamethylenediammonium adipate and caprolactam, in a liquid solvent containing at least 50% by weight of methanol, 2–10% by weight of a hydroxylic compound selected from the group consisting of isobutyl alcohol, benzyl alcohol, ethylene glycol and diethylene glycol, and a third component selected from the group consisting of (a) water (b) trichloroethylene and (c) water and trichloroethylene, the amount of solvent being effective to completely dissolve said interpolyamide, then adding progressively and with gentle stirring until the interpolyamide is completely precipitated, a liquid which is a non-solvent for the latter and contains up to 50% by weight of methanol, 2–10% by weight of the same hydroxylic compound, and the same third component, and drying the coated grains so obtained.

15. Process according to claim 14, wherein the solvent consists essentially of 75% methanol, 20% water and 5% ethylene glycol and the non-solvent consists essentially of 57% water, 40% methanol and 3% ethylene glycol, all percentages being by weight.

16. Process according to claim 14, wherein the solvent consists essentially of 80% methanol, 15% trichloroethylene and 5% benzyl alcohol and the non-solvent consists essentially of 20% methanol, 75% trichloroethylene and 5% benzyl alcohol, all percentages being by weight.

References Cited

UNITED STATES PATENTS

| | | | |
|---|---|---|---|
| 2,402,021 | 6/1946 | Compton | 117—161 X |
| 2,916,996 | 12/1959 | Coffee | 117—100 X |
| 2,943,926 | 7/1960 | Goepfert | 117—100 X |
| 3,091,596 | 5/1963 | Freedman et al. | 117—100 X |
| 3,173,817 | 3/1965 | Wright | 102—104 |
| 3,272,897 | 9/1966 | Herman et al. | 117—100 X |

WILLIAM D. MARTIN, *Primary Examiner.*

M. R. P. PERRONE, *Assistant Examiner.*

U.S. Cl. X.R.

117—161; 102—104